United States Patent [19]

Tabata et al.

[11] Patent Number: 4,552,659
[45] Date of Patent: Nov. 12, 1985

[54] APPARATUS FOR ELIMINATION OF BIOFOULING

[75] Inventors: Norikazu Tabata; Shigeki Nakayama; Keisuke Namba; Shiro Yamauchi, all of Amagasaki, Japan

[73] Assignee: Mitsubishi Denki Kabushiki Kaisha, Tokyo, Japan

[21] Appl. No.: 594,911

[22] Filed: Mar. 29, 1984

Related U.S. Application Data

[63] Continuation of Ser. No. 127,144, Mar. 4, 1980, abandoned.

[51] Int. Cl.⁴ ................................................ C02F 1/78
[52] U.S. Cl. ..................................... 210/177; 210/192; 210/205
[58] Field of Search ........ 210/760, 192, 177, 180–183, 210/205, 218

[56] References Cited

U.S. PATENT DOCUMENTS

| | | | |
|---|---|---|---|
| 2,872,397 | 2/1959 | Kiffer | 204/176 |
| 3,748,262 | 7/1973 | Lee et al. | 210/192 X |
| 3,997,631 | 12/1976 | Matsuoka et al. | 210/192 X |
| 4,136,027 | 1/1979 | Sakamoto et al. | 210/760 |
| 4,252,654 | 2/1981 | Leitzke et al. | 210/760 |
| 4,255,257 | 3/1981 | Greiner et al. | 210/760 X |

OTHER PUBLICATIONS

Sengupta et al., "Power Plant Cooling Water Treatment with Ozone", Int. Ozone Institute, pp. 120–134.
*Aquatic Applications of Ozone,* International Ozone Institute.

Primary Examiner—Thomas Wyse
Attorney, Agent, or Firm—Oblon, Fisher, Spivak, McClelland & Maier

[57] ABSTRACT

An apparatus for preventing biofouling caused by deposition and propagation of shellfish and algae in a cooling water system using sea water or river water for example, in a power plant, by periodically feeding ozone at high concentration to the system. An ozonizer is combined with an ozone-adsorbing and desorbing device so as to store ozone by adsorbing of an adsorbent and for a long time at lower temperature and desorbing ozone by periodically sucking at higher temperature if desired, by a water ejector.

1 Claim, 4 Drawing Figures

4,552,659

APPARATUS FOR ELIMINATION OF BIOFOULING

This is a continuation of application Ser. No. 127,144, filed Mar. 4, 1980, now abandoned.

BACKGROUND OF THE INVENTION

1. Field of the Invention

The present invention relates to an improvement of an apparatus for elimination of clogging caused by biofouling in water conduits such as condenser tubes of a power plant cooling system.

2. Description of the Prior Art

Sea water or river water is sucked by a pump and is passed through a pipe into a heat-exchanger to cool it and is discharged through a pipe.

In such a cooling water system, the deposition and the propagation of shellfish and algae on the walls of the pipes and the heat-exchanger cause a decrease in water feeding rate and heat transfer rate. It has been proposed to prevent such deposition and propagation of shellfish and algae by dosing chlorine or a chlorine type compound into the cooling water so as to impart the germicidal and algacidal effect of chlorine.

FIG. 1 shows one embodiment of the apparatus for elimination of biofouling. In FIG. 1, the reference numeral (1) designates a cooling water passage. The cooling water sucked by a pump (2) is fed to a feeding pipe (3) to cool a water-exchanger (4) and is discharged through a discharging pipe (5). Reference numeral (6) designates an apparatus for elimination of biofouling. A solution of a chlorine type oxidizing agent such as sodium hypochlorite or a chlorine-water prepared by absorbing chlorine which is stored in a tank (7), is fed by a fixed delivery pump (8) at a desired ratio through an inlet pipe (9) into the cooling water in the pipe (3). The deposition and the propagation of shellfish and algae on the wall of the water cooling system (1) are eliminated by the germicidal and algacidal effect of chlorine or the chlorine type compound.

An effective residual chlorine concentration in the cooling water in the apparatus for elimination of biofouling is controlled to be about 0.5 ppm. Chlorine reacts with impurities in the cooling water to be consumed. Therefore, in order to maintain 0.5 ppm of the effective residual chlorine concentration, it is usually necessary to feed a chlorine component at higher chlorine concentration such as higher than 1 ppm depending upon the impurity concentration in the cooling water.

In the apparatus for elimination of biofouling by the chlorine type compound, it is necessary to maintain about 0.5 ppm of the effective residual chlorine concentration in the cooling water. Therefore, the quantity of chlorine is so much as to cause expensive operation cost. Moreover, chlorine and chloride are discharged to the public water environment such as sea and river water. This may cause public pollution caused by forming toxic compounds from chlorine and organic compounds in the water. In order to prevent such public pollution, it is necessary to equip the system with a waste water treating apparatus, which causes high cost.

In order to overcome these disadvantages of the apparatus for elimination of biofouling, it has been proposed to provide an apparatus for elimination of trouble caused by biofouling in the cooling water system without causing public pollution by using a biocide other than the chlorine type compound. Ozone has a number of desirable characteristics as a biocide. For example, ozone is easily self-decomposed within a short time and does not cause any impurity to remain except oxygen by its decomposition.

The deposition and propagation of shell-fish and algae on the walls of the cooling water system can be eliminated by continuously feeding ozone to provide the effective residual ozone concentration of about 0.1 ppm. In order to maintain 0.1 ppm of the effective residual ozone concentration, it is necessary to feed ozone at a rate corresponding to the residual ozone and ozone consumed by the oxidation of impurities. The rate of ozone fed is several times that of the effective residual ozone concentration such as about 0.5 ppm. The latter apparatus for elimination of biofouling by the deposition and propagation of shellfish and algae on the walls of the cooling water system has the advantage of no public pollution. However, it is not economical to utilize it in an industrial operation because the cost of ozone is four times of the cost chlorine.

SUMMARY OF THE INVENTION

It is an object of the present invention to overcome the disadvantages of the conventional apparatus and to provide an economically feasible apparatus for elimination of biofouling in a water cooling system without any public pollution by periodically feeding ozone at high concentration.

DETAILED DESCRIPTION OF THE PREFERRED EMBODIMENTS

Figure 2:
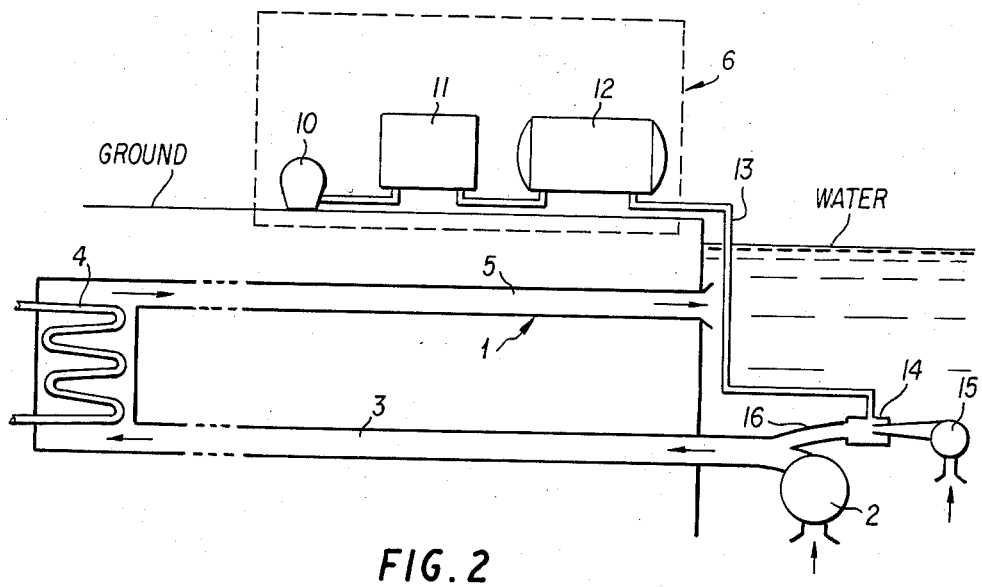
FIGS. 2 and 3 are respectively schematic views of embodiments of the apparatus for elimination of biofouling of the present invention.

Referring to FIG. 2, one embodiment of the apparatus for elimination of biofouling will be illustrated.

Figure 1:
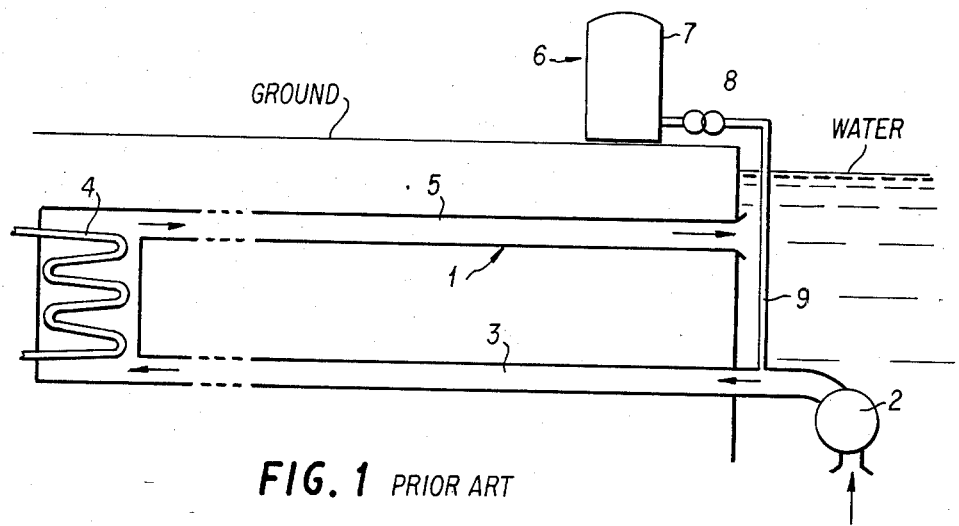
FIG. 1 is a schematic view of one embodiment of an apparatus for elimination of biofouling by using a chlorine type compound.

In FIG. 2, the cooling water system (1) has structure similar to that of the conventional apparatus shown in FIG. 1. In the cooling water system, water sucked by the pump (2) is fed through the pipe (3) into the heat-exchanger (4) to cool it and is discharged through the pipe (5). Reference numeral (6) designates an apparatus for elimination of biofouling which prevents the deposition and propagation of shellfish and algae by feeding ozone generated by a silent discharge, into the cooling water in the pipe (1). The ozone is generated by pressurizing air by a blower (10), drying the air in an air dryer (11) to be lower than −40° C. of a dew point and feeding it into an ozonizer (12) to convert a part of oxygen in the air into ozone by a silent discharge so as to generate the air containing ozone at high concentration (high ozone-containing air). The high ozone-containing air is fed through a pipe for ozone (13) into a gas mixer (14) (a water ejector) and is mixed as fine bubbles into water fed from a pump (15) to dissolve ozone into water at high concentration.

The ozone water containing fine bubbles is passed through a pipe for ozone-water (16) into the pipe (3) of the cooling water system (1), whereby the shellfish and algae deposited on the walls of the cooling water system (1) are killed to prevent biofouling. The ozone-water at high concentration is periodically fed, following which the operation of the apparatus for elimination of biofouling (6) is stopped until the next feeding time. The apparatus (6) and the pump (15) are operated in synchronizing steps.

The reason why the elimination of biofouling can be attained by a periodical feeding of the ozone-water at high concentration will be illustrated.

In accordance with the experiments, the biofouling can be prevented by feeding ozone-water at effective residual ozone concentration of 5 to 10 ppm for 5 minutes once a day. The propagation of shellfish and algae is increased in exponential function. When the shellfish and algae are killed at the initial stage of the propagation, by the contact with ozone-water at high concentration, the shellfish and algae are completely killed. When this is repeated, the propagation can be prevented and the clogging of the cooling water passage by the shellfish and algae as the biofouling can be completely eliminated.

In said experiment, ozone is fed at the effective residual ozone concentration of 5 to 10 ppm for 5 minutes once a day. The condition can be varied depending upon the kind and amount of the shellfish and algae, the temperature and the amount of impurities in the cooling water. Accordingly, the effective residual ozone concentration is several to several tens ppm and the ozone feeding time is 3 to 10 minutes once a half day to 3 days.

In accordance with the apparatus for elimination of biofouling by periodically feeding ozone at high concentration, the total amount of ozone can be reduced to about 1/10 of the ozone quantity required by the apparatus for feeding ozone continuously at low concentration.

An apparatus for periodically feeding a chlorine type compound can be considered to reduce the cost. However, the germicidal and algacidal effect is not so increased by increasing the concentration of the chlorine type chemical. When the chlorine type compound at high concentration is periodically discharged into the water system, public pollution is caused even though the total amount of the chlorine type compound is decreased.

On the other hand, the ozonizer for generating high concentration of ozone is operated only for short time and is stopped for most of the time. Therefore, the rate of operation of the ozonizer is remarkably low and the cost of the apparatus for generating ozone at high concentration for a short time is disadvantageously expensive.

The following embodiment is to overcome such disadvantages and to provide a compact and economical apparatus having high efficiency which generates ozone for a long time before feeding ozone, adsorbs the ozone on an adsorbent such as silica gel so as to store ozone in the adsorbed condition and takes out periodically the ozone by sucking it under a reduced pressure.

Figure 3:
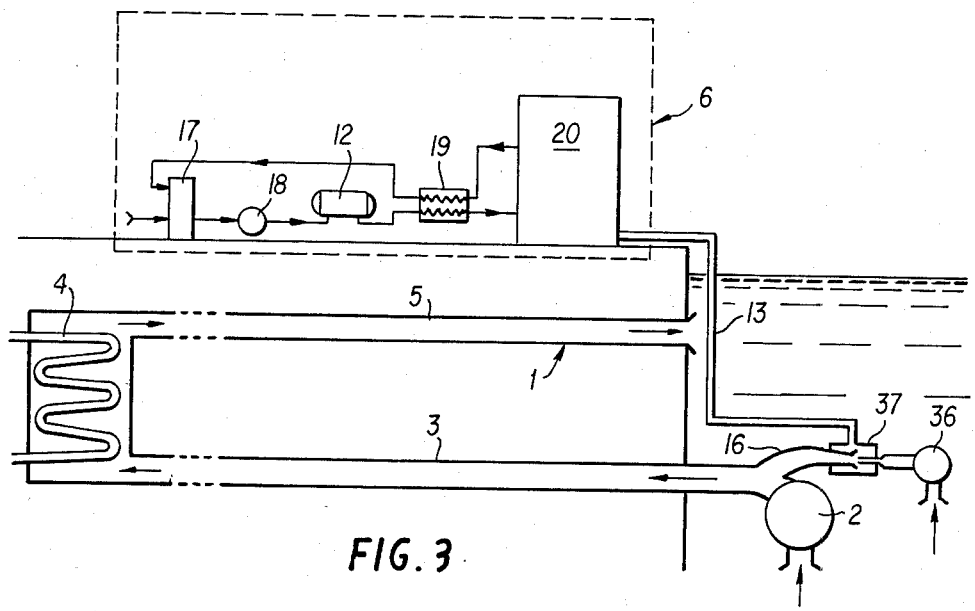

Referring to FIG. 3, the second embodiment will be illustrated. In FIG. 3, reference numeral (1) designates a cooling water system which is the similar to that of the conventional apparatus shown in FIG. 1 and reference numeral (6) designates an apparatus for elimination of biofouling. In the apparatus for elimination of biofouling (6), the starting material oxygen stored in an oxygen tank (17) is fed into a ozonizer (12) by a blower (18). The ozonizer (12) can be a conventional type ozonizer which has relatively low ozonizing efficiency. A part of oxygen in the ozonizer (12) is ozonized by a silent discharge to generate ozone-containing oxygen. The ozone-containing oxygen is cooled by a heat-exchanger (19) and is fed into an ozone adsorbing and desorbing device (20) so as to adsorb only ozone on an adsorbent. The residual oxygen is heat-exchanged in the heat-exchanger (19) (to a room temperature) and is returned to the oxygen tank (17) and is reused.

Figure 4:
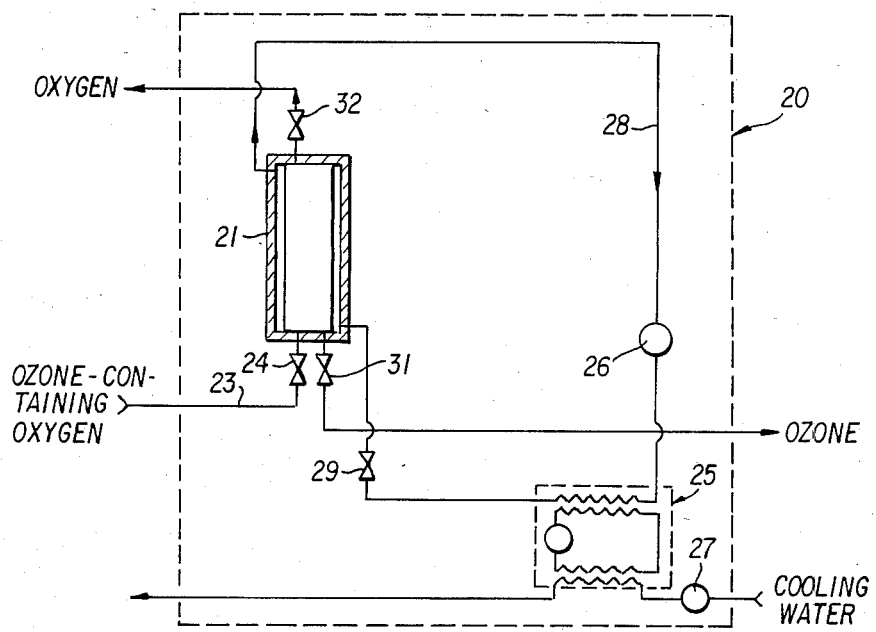
FIG. 4 is a schematic view of one embodiment of an ozone-adsorbing and desorbing device used in the apparatus of the present invention.

FIG. 4 shows the ozone-adsorbing and desorbing device (20) for adsorbing and storing ozone in detail. For example, an adsorption column (21) is placed in the device (20).

In an ozone-adsorbing step, the ozone-containing oxygen fed through a pipe (23) is passed through a motor operated valve (24) into the adsorption column (21). The ozone-containing oxygen is brought into contact with the silica gel packed in the column so as to adsorb only ozone. The ratio of ozone adsorbed on the silica gel is higher depending upon lowering the temperature of the silica gel. Brine at low temperature which is cooled by a cooling device (25) is recycled through an outer jacket of the adsorption column (21) so as to cool the silica gel. The temperature of the cooled brine is usually in a range of about $-30°$ to $-60°$ C., in a practical operation from the viewpoints of economical operation of the cooling system depending on the nature of the cooling device (25), the pump for recycling brine (26), the pipe for brine (28), the motor operated valve (29) and the pump for cooling water (27).

When the silica gel is saturated with ozone in the adsorption column (21), the ozonizer (12) automatically stops its operation and all of the motor operated valves (24), (31), (32) are closed to await the next ozone-desorbing step. In order to desorb ozone from the silica gel, the operation is easier at higher temperature. Thus, the operation of the cooling system is stopped before the feeding of the ozone into the cooling water system (1) and the temperature of the silica gel is elevated to a desired temperature in the ozone-desorbing step. Therefore, the operation of the ozonizer (12) is controlled so as to finish the process of adsorption of ozone on the silica gel (ozone saturated state) in the adsorption column (21) at the desired time before the feeding of ozone into the cooling water system (1). It is necessary to have a time for elevating the temperature of the silica gel so as to easily desorb ozone.) The generation of ozone and the rate of the ozone in the adsorbing operation are controlled depending upon the control of the operation time such as the start of the operation or the control of the discharge voltage. The operations of the ozonizer (12) and the cooling system can be synchronized whereby the control of the operation is made easy and the time required for the operation of the cooling system is not so long and can be shortened and the cost for the operation can be lower.

At the periodical time for feeding ozone into the cooling water system (1); the motor operated valves (31), (34) for the adsorption column (21) are opened and the stored ozone is sucked under a reduced pressure from the adsorption column (21) through the pipe (13) by driving the ejector pump (36) shown in FIG. 3 under the ejection effect of the water ejector (37).

The ozone sucked is injected as fine bubbles, into water fed from the ejector pump (36) whereby ozone is dissolved with water to form the ozone-water. The ozone-water is fed from the pipe (16) into the pipe (3) of the cooling water system (1). The water ejector (37)

imparts the function for desorbing and sucking ozone adsorbed in the adsorption column (21) and a reduced pressure (a decomposition of ozone is lower at a lower pressure) and the function for dissolving ozone into water. In the ozone desorbing step, the temperature of the silica gel is elevated so as to be easily desorbed.

The number of the adsorption columns in the ozone adsorbing and desorbing device is not critical and is dependent upon an ozone-storing capacity in the adsorption column, a period for feeding ozone, a concentration of ozone, a ratio of feeding ozone and an operation time of the ozonizer to be economical.

In said embodiment, the elimination of biofouling for preventing the deposition and propagation of shellfish and algae on the walls of the cooling water system has been illustrated. A similar effect can be attained by applying the apparatus of the present invention to the other water pipes, water tanks and water ditches.

In accordance with the apparatus of the present invention, ozone at high concentration which is periodically fed is generated by a compact ozonizer and ozone can be stored in the ozone adsorbing and desorbing device whereby the apparatus can be compact and has high rate of operation. Oxygen is used as the starting material for ozone whereby an electric power for the silent discharge can be highly decreased. The oxygen which is not converted into ozone is recycled and accordingly, the cost for the operation is reduced even though oxygen is used.

I claim:

1. Apparatus for the elimination of biofouling of a water system comprising:
   an oxygen supply tank;
   an oxygen pressure boost means;
   a low-efficiency ozonizer;
   a first heat exchanger means having a high temperature side and a low temperature side;
   first, second, third and fourth motor operated valves;
   a thermal conditioning recycling pump;
   a second heat exchanger means having first, second third and fourth fluid ports;
   a water ejector in communication with said water system;
   a water ejector pump in communication with said water ejector; and
   a single adsorption column, wherein said adsorption column further comprises an ozone adsorbent, a thermal conditioning jacket disposed around said adsorbent for heating and cooling said adsorbent, first and second thermal conditioning ports in communication with said jacket, and exactly three gas ports in communication with said adsorbent, said three gas ports further comprising a gas inlet and first and second gas outlets; wherein said apparatus further comprises
   a closed gas-handling piping path comprising and extending uninterrupted from said first gas outlet of said adsorption column, through said first motor controlled valve, through said low temperature side of said first heat exchanger means, through said oxygen supply tank, through said oxygen pressure boost means, through said low-efficiency ozonizer, through said high temperature side of said first heat exchanger means, through said second motor operated valve and to said gas inlet of said adsorption column;
   a closed thermal conditioning piping loop for circulating a first thermal conditioning fluid to selectively heat and cool said adsorbent, wherein said thermal conditioning loop further comprises and extends through said thermal conditioning jacket and from said first thermal conditioning port of said adsorption column to said second thermal conditioning port of said adsorption column, wherein said thermal conditioning loop further comprises said thermal conditioning recycling pump, said third motor controlled valve and said first and second fluid ports of said second heat exchanger means;
   means for passing a second thermal conditioning fluid through said third and fourth ports of said second heat exchanger means;
   an ozone ejecting piping path extending uninterrupted from said second gas outlet of said adsorption column, through said fourth motor operated valve and thence to said water ejector;
   wherein said water ejector and said water ejector pump further comprise means for selectively rapidly desorbing ozone from said adsorbent and injecting said ozone at high concentration into said water system; and
   wherein said thermal conditioning loop further comprises means for heating said adsorbent during said desorbing and ejecting and means for cooling said adsorbent during operation of said ozonizer.

* * * * *